United States Patent
Bikumala et al.

(10) Patent No.: US 10,712,840 B2
(45) Date of Patent: Jul. 14, 2020

(54) ACTIVE PEN SYSTEM

(71) Applicant: Dell Products L.P., Round Rock, TX (US)

(72) Inventors: Sathish Kumar Bikumala, Round Rock, TX (US); Jace William Files, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 18 days.

(21) Appl. No.: 15/783,410

(22) Filed: Oct. 13, 2017

(65) Prior Publication Data

US 2019/0113986 A1    Apr. 18, 2019

(51) Int. Cl.
```
G06F 3/0354    (2013.01)
G06F 3/0488    (2013.01)
G06F 3/044     (2006.01)
G06F 3/038     (2013.01)
G06F 3/01      (2006.01)
```

(52) U.S. Cl.
CPC ............ *G06F 3/0383* (2013.01); *G06F 3/016* (2013.01); *G06F 3/017* (2013.01); *G06F 3/03545* (2013.01); *G06F 3/04883* (2013.01); *G06F 3/044* (2013.01)

(58) Field of Classification Search
CPC .... G06F 3/0383; G06F 3/04883; G06F 3/017; G06F 3/03545; G06F 3/044
See application file for complete search history.

(56) References Cited

U.S. PATENT DOCUMENTS

| | | | | |
|---|---|---|---|---|
| 5,611,036 A * | 3/1997 | Berend | ................. | G06T 11/001 345/441 |
| 6,330,359 B1 * | 12/2001 | Kawabata | ........... | G06F 3/03545 382/188 |
| 2010/0051356 A1 * | 3/2010 | Stern | .................... | G06F 3/03545 178/19.04 |
| 2010/0220065 A1 * | 9/2010 | Ma | ......................... | G06F 3/016 345/173 |
| 2010/0315373 A1 * | 12/2010 | Steinhauser | ............ | G01L 1/205 345/174 |
| 2011/0310066 A1 * | 12/2011 | Fermgard | ................ | B43K 8/00 345/179 |
| 2013/0249823 A1 * | 9/2013 | Ahn | ........................ | G06F 3/038 345/173 |
| 2014/0101579 A1 * | 4/2014 | Kim | ...................... | G06F 3/0486 715/761 |
| 2014/0253522 A1 * | 9/2014 | Cueto | ................. | G06F 3/03545 345/179 |

(Continued)

*Primary Examiner* — Mihir K Rayan
(74) *Attorney, Agent, or Firm* — Haynes and Boone, LLP

(57) ABSTRACT

An active pen includes a pen chassis including a pen tip and a pressure sensitive gripping element that is accessible on at least a portion of an outer surface of the pen chassis. The pen chassis houses a communication system, a processor, and a memory that includes instructions that, when executed by the processing system, causes the processing system to provide a pressure input engine that is configured to capture first force data and first location data generated by a first user interaction with the pressure sensitive gripping element at a first time. The pressure input engine then uses the first force data and first location data to provide an input to a graphical user interface provided on a display screen of a computer device.

14 Claims, 9 Drawing Sheets

(56) References Cited

U.S. PATENT DOCUMENTS

2014/0340318 A1* 11/2014 Stringer ............. G06F 3/03545  
                                                                              345/173  
2015/0363035 A1* 12/2015 Hinckley ............. G06F 3/0383  
                                                                              345/173

\* cited by examiner

ACTIVE PEN SYSTEM

BACKGROUND

The present disclosure relates generally to information handling systems, and more particularly to an active pen system for use with an information handling system.

As the value and use of information continues to increase, individuals and businesses seek additional ways to process and store information. One option available to users is an information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some IHSs such as, for example, tablet computing devices, mobile phones, laptop/notebook computing devices, and/or a variety of other computing devices known in the art, may be provided with an active pen that allows a user to provide inputs to the computing device by, for example, enabling direct digital "ink" input via the active pen's engagement with a display screen on the computing device to provide the user with a "pen-on-paper" experience with the computing device (e.g., the engagement of the active pen with the display screen causing graphical elements to be displayed on the display screen.) To enhance the "pen-on-paper" experience, active pens have been developed that allow the user to change their "brush stroke" or the "amount of ink" displayed in response to an active pen engagement with the display screen by applying more or less pressure to the display screen with a pen tip of active pen. In such systems, the pen tip may be configured to read the pressure when engaged with the display screen, and may then operate with the computing device to change the graphical elements displayed on the display screen so that those graphical elements may be displayed to appear like those of an actual pen, a marker, a brush, a pencil, and/or other conventional drawing tools known in the art.

However, engagement of the active pen with the display screen can compromise the user's grip and/or other ability to control the active pen. Furthermore, applying pressure through the pen tip to the display screen causes wear on the pen tip and the display screen, and resulting damage to the display screen caused by active pens is particularly problematic in devices that include relatively fragile flexible organic light emitting diode (OLED) display screens. Further still, some touch display screens are "touchless" or "virtual" in that the user does not have to actually physically engage the display screen with the user's finger or active pen in order to provide an input (as the user would on a touch display that requires physical contact.) As such, requiring a user to engage a touchless/virtual display screen with an active pen to determine pen tip pressure as discussed above defeats the purpose of such touchless/virtual display screens.

Accordingly, it would be desirable to provide an improved active pen system.

SUMMARY

According to one embodiment, an information handling system (IHS) input system, includes: an IHS including: an IHS communication system; an IHS processing system coupled to the IHS communication system; and an IHS display screen coupled to the IHS processor; and a pen that is configured to provide an input to the IHS, the pen including: a pen tip; a pressure sensing system that includes a pressure sensitive gripping element that is accessible on at least a portion of an outer surface of the pen; a pen communication system; a pen processing system coupled to the pressure sensing system and pen communication system; and a pen memory system that includes instructions that, when executed by the pen processing system, causes the pen processing system to provide a pressure engine that is configured to: capture first force data and first location data generated by a first user interaction with the pressure sensitive grip at a first time; and using the first force data and first location data to provide an input to a graphical user interface provided on the IHS display screen.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
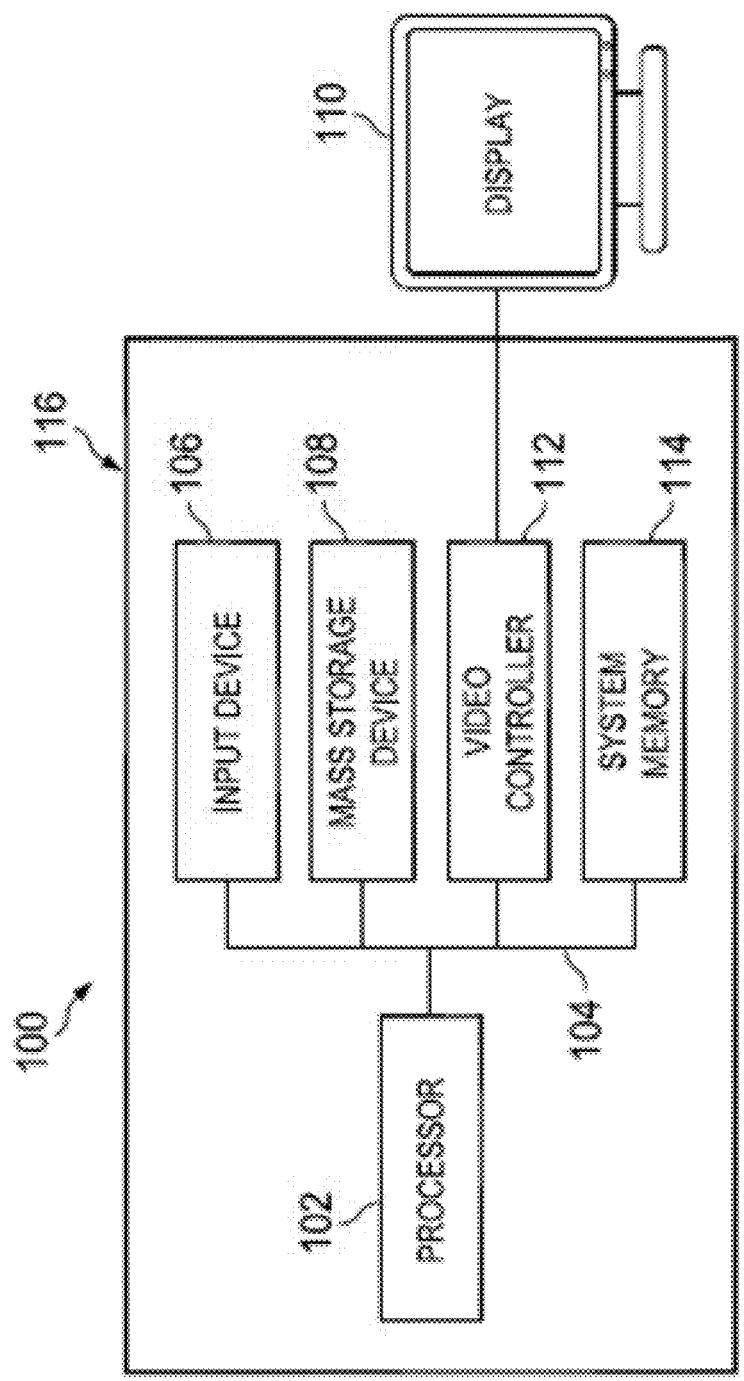
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

The specific examples of the systems and methods provided below are directed to active pen systems including an active pen and a touch input computing device. There are a wide variety of active pen systems that will fall within the scope of the present disclosure. For example, a first type of active pen system that may utilized according to the teachings of the present disclosure may include an active pen that that is configured to directly communicate pen XY location, pressure information, and input button actuation to a touch controller chip or other processor in the computing device so that the computing device may implement an algorithm to detect when the active pen is present and perform the functionality discussed below. In another example, a second type of active pen system that may be utilized according to the teachings of the present disclosure includes an active pen and a computing device that determines the location of the pen tip in the same manner that is used for determining the position of a finger relative to a touch input display screen, with pressure information and input button actuation conveyed similarly to the first type of active pens discussed above. In another example, a third type of active pen system that may be utilized according to the teachings of the present disclosure includes a computing device determining the location of a pen tip on the active pen in the same manner that is used for determining the position of a finger relative to a touch input display screen, with pressure information and input button actuation conveyed by the active pen to the computing device using sideband communications methods such as, for example, a Bluetooth connection between the active pen and the computing device.

In another example, a fourth type of active pen system that may be utilized according to the teachings of the present disclosure includes an active pen similar to those used with active whiteboards or touch sensitive televisions, and includes a computing device determining the location of a pen tip on the active pen optically using, for example, an invisible dot pattern on the computing device display screen and an optical sensor on the active pen, with pressure information and input button actuation conveyed using sideband communications methods such as, for example, a Bluetooth connection between the active pen and the computing device. In another example, a fifth type of active pen system that may be utilized according to the teachings of the present disclosure includes an active pen that emits an ultrasonic acoustic signal that may be detected by an array of microphones on the computing device, which allows for the resolving of the XY position of the active pen based on the phase relationship of the acoustic signal detected at each microphone. However, while a few examples of specific active pen systems are described, one of skill in the art in possession of the present disclosure will recognize how the teachings of the present disclosure may benefit a variety of other active pen systems, and thus those active pen systems will fall within its scope as well.

Furthermore, the computing device used in the active pen system of the present disclosure may include a capacitive-based touch display device or screen that is configured to detect finger touch position using a grid of X and Y sensor lines wired into a touch sensor chip or other processor that is configured to transmit signals on one sensor line while listening for that signal on other sensor lines. As would be understood by one of skill in the art in possession of the present disclosure, a user's finger contacting the capacitive-based touch display device/screen may provide a coupling of adjacent or perpendicular receiver sensor lines, and the computing device may then use various proprietary scanning algorithms to resolve XY finger position relative to the touch display device/screen. Further still, some capacitive-based touch display devices/screens may also be configured to detect signals transmitted from an active pen (e.g., the first type of active pen discussed above). as such, when the active pen is detected and the touch sensor chip/processor switches to active pen mode, some or all of the sensor lines in the capacitive-based touch display device or screen may be set to a listen mode so that the position of the pen tip on the active pen may be accurately determined.

In some cases, signals including other data may be communicated from the active pen to the touch sensor chip/processor in the capacitive-based touch display device or screen through the sensor lines to, for example, convey information about the applied force on the active pen tip, convey when buttons on the active pen are pressed, and/or convey a variety of other information that would be apparent to one of skill in the art in possession of the present disclosure. In another example, the computing device may include a virtual touch display which may be provided by a "touchless" touch display device or screen, and that may include optical sensors (e.g. Kinect® by Microsoft®), and/or other sensors (e.g., moisture sensors, light sensors that are included in the display device that houses the display screen) that track user/object movements and/or detect the presence of an object in an environment, and provide associated inputs to the display screen without the user actually physically engaging the display screen with the user's finger or an active pen. Thus, while some display devices/screens may be provided as touch display devices/screens, touch display devices/screens described herein may also refer to touchless/virtual touch display devices/screens that do not require physical interaction with the display screen to provide an input such as, for example, electromagnetic resonance (EMR) pen technology by Wacom® and/or light reflection technology by InGlass™ by FlatFrog®.

Figure 2:
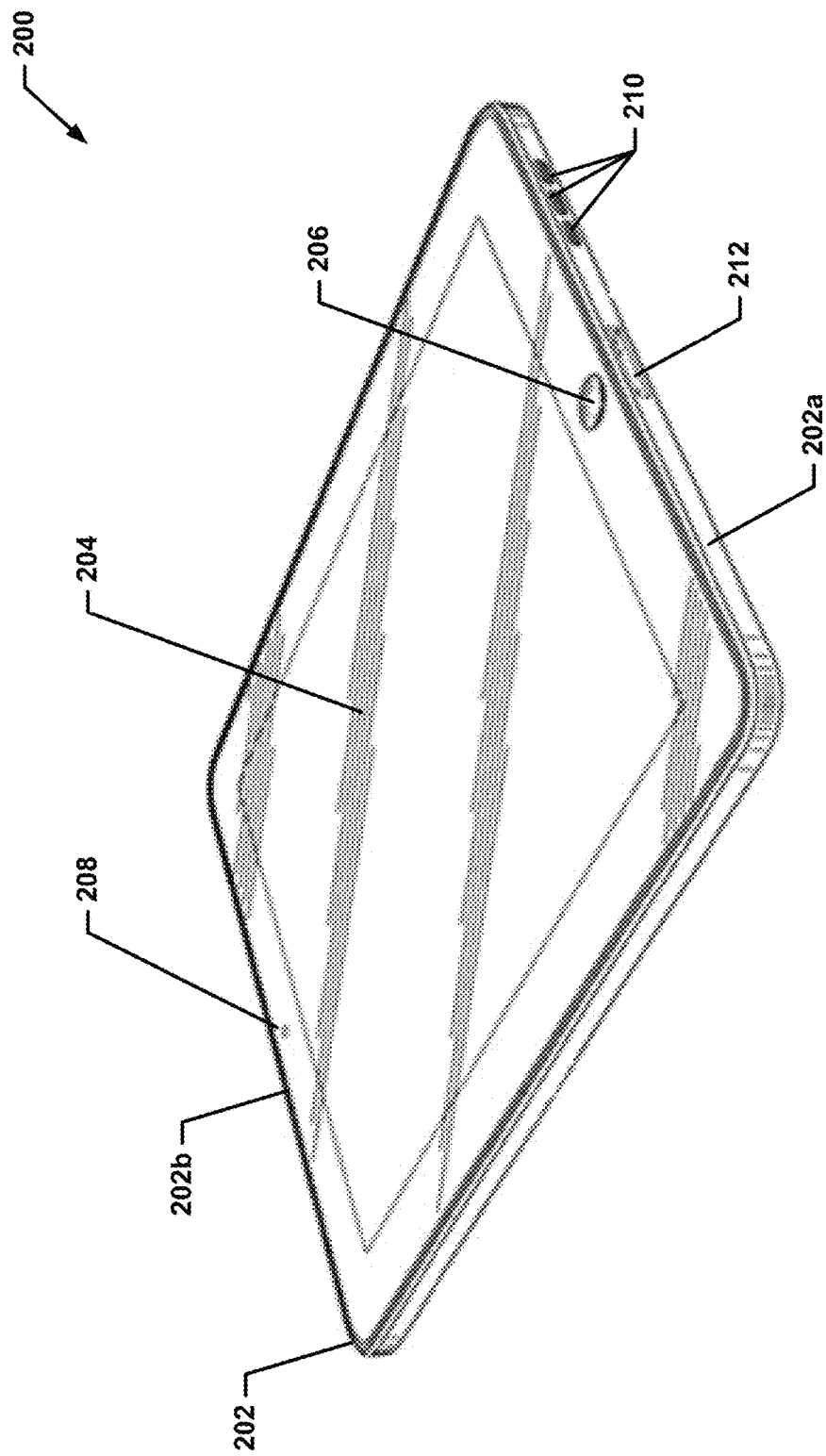
FIG. 2 is a perspective view illustrating an embodiment of a computing device.

Referring now to FIG. 2, an embodiment of an computing device 200 is illustrated. The computing device 200 may be the IHS 100, discussed above with reference to FIG. 1, and/or may include some or all of the components of the computing device 100. In the illustrated embodiment, the computing device 200 is a tablet computing device that is configured (e.g., via hardware and/or software) to operate with the active pens of the present disclosure. However, one of skill in the art in possession of the present disclosure will recognize that a wide variety of computing devices (e.g., mobile phones, laptop/notebook computing devices, desktop computing devices, etc.) that utilize active pens will benefit from the teachings of the present disclosure and thus will fall within its scope as well. In some embodiments, the computing device 200 may include active pen interaction components that are configured to interact with the active pens discussed below, while in other embodiments, the computing device 200 may not need any specialized components to interact with the active pens discussed below (i.e., the components in the computing device 200 used to provide conventional touch screen functionality via a user's fingers may be utilized to interact with the active pens discussed below without the need for any other specialized active pen interaction components).

The computing device 200 includes a chassis 202 that houses the components of the computing device (e.g., a processing system, memory system, storage system, etc.), which may include a display screen 204 that is partially housed in the chassis 202 and that provides an input surface of the computing device 200 via a touch sensitive display (e.g., using capacitive touch detecting systems, other touch detecting systems discussed above, and/or a variety of other touch detecting systems known in the art.) At least one input button 206 may be provided on the chassis 202 between the display screen 204 and a bottom edge 202a of the chassis 202. A camera 208 may be provided on the chassis 202 between the display screen 204 and a top edge 202b of the chassis 202. A speaker/microphone system 210 may be provided on the bottom edge 202a of the chassis 202, and a data connector 212 may be provided on the bottom edge 202a of the chassis 202 adjacent the speaker/microphone system 210. While a specific computing device 200 has been illustrated and described, one of skill in the art in possession of the present disclosure will recognize that the computing device 200 (or other computing devices used with the active pens discussed below) may include a variety of other components and features, and/or have the illustrated components and features arranged differently, while remaining with the scope of the present disclosure.

Figure 3A:
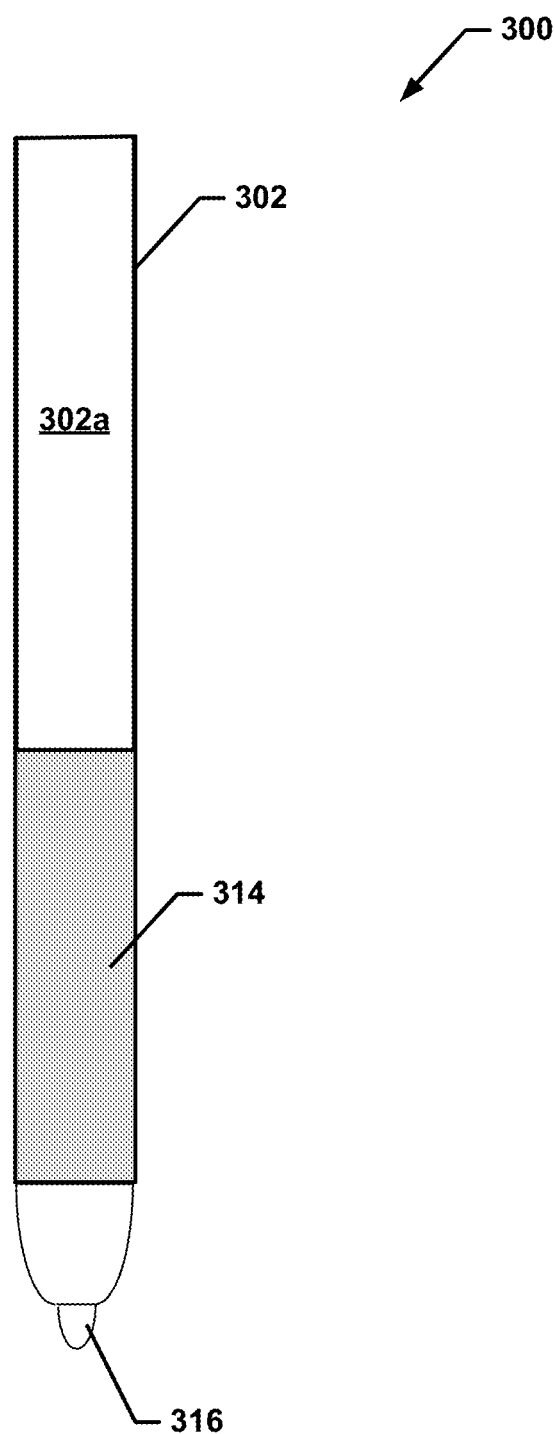
FIG. 3A is a front view illustrating an embodiment of an active pen.
Figure 3B:
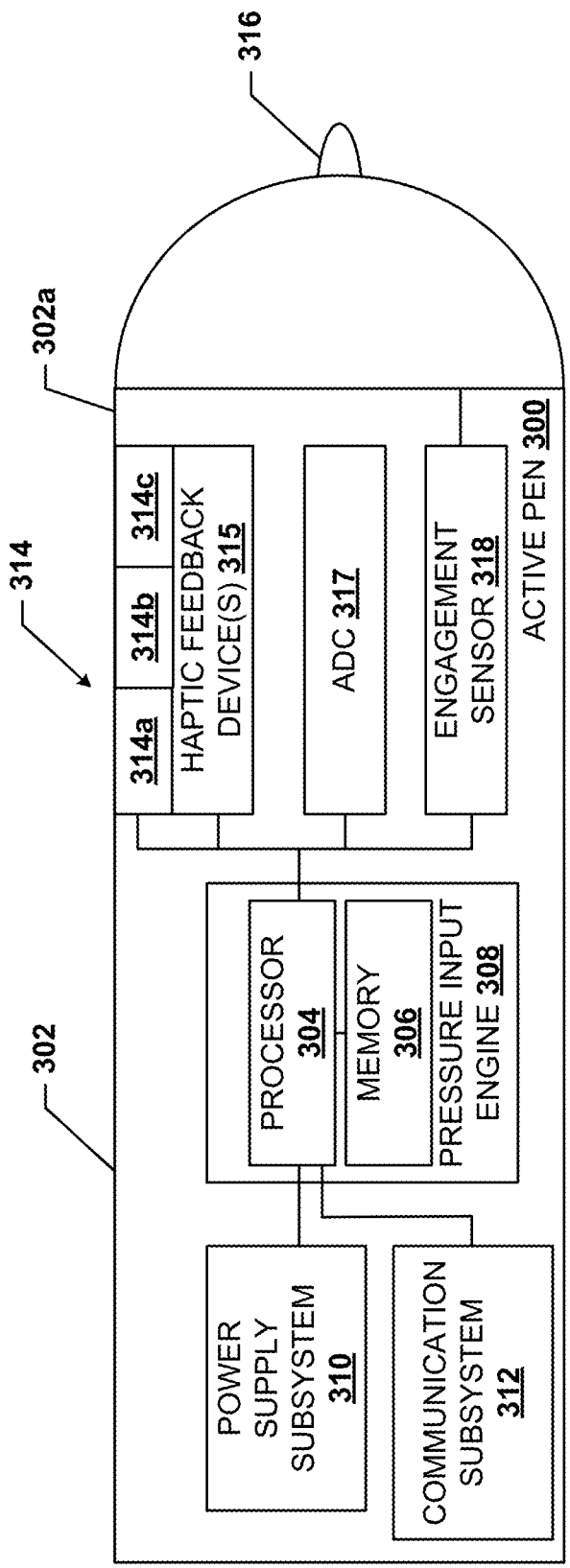
FIG. 3b is a schematic view illustrating an embodiment of the active pen of FIG. 3A.

Referring now to FIGS. 3A and 3B, and embodiment of an active pen 300 is illustrated. In different embodiments, the active pen 300 may be a capacitive active pen, other active pens discussed above, and/or a variety of other active pen types that may be configured to send signals to computing devices and/or their display screens in order to, for example, allow for the spatial locating of the active pen relative to the display screens. The active pen 300 includes a pen chassis 302 that houses the components of the active pen 300, only some of which are illustrated in FIG. 3B. For example, the pen chassis 302 may house a processing system 304 and a memory system 306. The memory system 306 is coupled to the processing system 304 and may include instructions that, when executed by the processing system 304, cause the processing system 304 to provide a pressure input engine 308 that is configured to perform the functionality of the pressure input engines and active pens, as well as any other functionality, discussed below. The pen chassis 302 may further house a communication subsystem 312 that is coupled to the pressure input engine 308 (e.g., via a coupling between the communication subsystem 312 and the processing system 304) and that may be configured to provide for wireless communication via a network using IEEE 802.11 protocols (Wi-Fi), via wired communications (e.g., the Ethernet protocol), and or direct communications with the computing device 200 utilizing various direct wireless communication protocols such as Bluetooth®, Bluetooth® Low Energy (BLE), near field communication (NFC), infrared data association (IrDA), ANT, Zigbee, and other wireless communication protocols that allow for direct wireless communication between devices.

The pen chassis 302 also houses a power supply system 310 that may include or be configured to couple to a battery. For example, the power supply system 310 may include an integrated rechargeable battery that may be recharged in the pen chassis 302 using methods known in the art, and/or may include other power sources known in the art. In some embodiments, the computing device 200 discussed above with reference to FIG. 2 may be configured to couple to and/or store the pen chassis 302 and, in some cases, recharge a rechargeable battery included in the power supply system 310. However, in other embodiments, the power supply system 310 may be configured to accept a replaceable, non-rechargeable battery while remaining within the scope of the present disclosure.

The pen chassis 302 also includes a pen tip 316 that is coupled to the processing system 304 and, while not described in detail below, the processing system 304 may be configured to operate with other components in the pen chassis 302 (illustrated or not illustrated) to send signals to a computing device and/or display screen that are based on, through, and/or otherwise utilizing the pen tip 316. The pen tip 316 may also be coupled to an engagement sensor 318 that is coupled to the processing system 304 and that may include a pressure sensing device, a capacitive sensing device, force sensors that incorporate force sensing resistor(s), displacement sensors combined with springs or other resilient members to facilitate indirect measurements of force (e.g., linear variable transformers, optical encoders, and/or switches that close at a threshold force), and or a variety of other devices that are operable to detect an engagement of the pen tip 316 with a display screen, as discussed in further detail below.

The pen chassis 302 may also include a pressure sensing system that includes a pressure sensitive gripping element 314 that is accessible on at least a portion of an outer surface 302a of the pen chassis 302. The pressure sensitive gripping element 314 may include a plurality of pressure sensors 314a, 314b, and up to 314c that are positioned about the outer surface 302a of the pen chassis 302. While three pressure sensors 314a-314c are illustrated, on skilled in the art will in possession of the present disclosure will recognize that the pressure sensitive gripping element 314 may include a single pressure sensing device that is configured to perform the functionality discussed below, as well as a plurality of pressure sensors that are configured to perform the functionality discussed below. The pressure sensors 314a-314c may include capacitive sensing device(s), force sensor(s) incorporating force sensing resistor(s), and/or displacement sensor(s) combined with springs or other resilient members to facilitate indirect measurements of force (e.g., linear variable transformers, optical encoders, and/or switches that close at a threshold forces.) For example, each pressure sensor 314a, 314b, and 314c may be accessible on the outer surface 302a of the pen chassis 300 and at respective locations on the outer surface 302a where a user's index finger, middle finger, and thumb are typically used to hold a pen or pencil in a tripod support orientation that one of skill in the art in possession of the present disclosure will appreciate is typically used when writing with conventional writing instruments.

However, various other support orientations may dictate the location for the pressure sensors 314a, 314b, and 314c, as well as additional or fewer pressure sensor locations on the outer surface of the pen chassis 300 for various other pen support orientations such as, for example, a fisted grasp of the pen chassis 300 using all five fingers, a quadrupod grasp of the pen chassis 300 using four fingers, a pinch grasp of the pen chassis 300 using two fingers, and/or other various grasping configurations known in the art. In some embodiments, the pressure sensors 314a, 314b, 314c may be included in a pressure sensor grid that includes a plurality of pressure sensors and that covers at least a portion of the outer surface 302a of the pen chassis 302 (e.g., that is expected to be used by a majority of users to grasp the pen chassis 300.) For example, the pressure sensor grid may be a pressure sensor grid available from SENSEL® of Mountain View, Calif., United States, and may include a 0.1-0.25 mm thick pressure sensor grid that is flexible such that it may be wrapped around at least a portion of the outer surface 302a of the pen chassis 302, and that allows a location (e.g., an XY coordinate) of an input to each pressure sensor in the pressure sensor grid to be determined as discussed in further detail below.

The pressure sensing system may also include an analog-to-digital converter (ADC) 317 that is configured to convert analog signals generated from the pressure sensors into digital signals that can be processed by the processing system 304. In some embodiments, the pressure sensing system may also include at least one haptic feedback device 315 that is configured to provide sounds, vibrations, visualizations, and/or other tactile and/or haptic feedback known in the art when, for example, a user interacts with the pressure sensitive gripping element 314 and a predetermined criteria is met by that user interaction.

Figure 4:
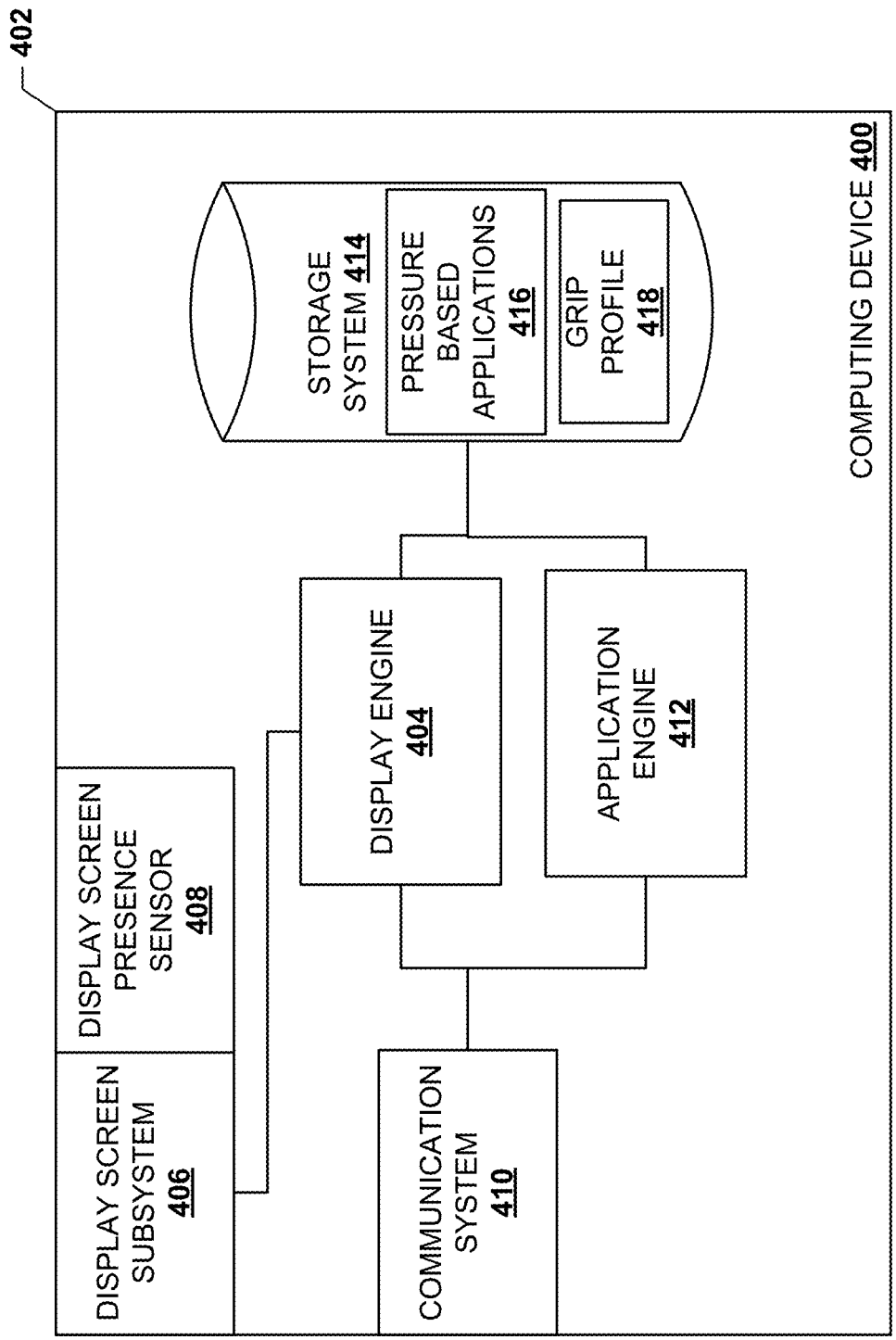
FIG. 4 is a schematic view illustrating an embodiment of the computing device of FIG. 2.

Referring now to FIG. 4, an embodiment of a computing device 400 is illustrated that may be the computing device 200 discussed above with reference to FIG. 2. As such, the computing device 400 may be the IHS 100 discussed above with reference to FIG. 1, and/or may include some or all of the components of the IHS 100. As discussed above, while the computing device 400 is described below as a mobile computing device such as a laptop/notebook computer device, a tablet computing device, or a mobile phone, a computing device 400 may be provided by desktop computing devices, server computing devices, televisions, and/or a variety of other computing devices that would be apparent to one of skill in the art in possession of the present disclosure. In the illustrated embodiment, the computing device 400 includes a chassis 402 that houses the components of the computing device 400, only some of which are illustrated in FIG. 4. For example, the chassis 402 may house a processing system (not illustrated, but which may be provided by the processor 102 discussed above with reference to FIG. 1) and a memory system (not illustrated, but which may be provided by the memory 114 discussed above with reference to FIG. 1) that includes instructions that, when executed by the processing system, cause the processing system to provide a display engine 404 that is configured to perform the functions of the display engines and computing devices discussed below. In a specific example, the processing system may include a graphics processing unit (GPU) that is configured to render content information and input information as discussed below.

The chassis 402 also houses a display screen subsystem 406 that is coupled to the display engine 404 (e.g., via a coupling between the processing system and the display screen subsystem 406). In an embodiment, the display screen subsystem 406 may be provided by a display device that is integrated into the computer system 400 and that includes a display screen (e.g., a display screen on a laptop/notebook computing device, a tablet computing device, or a mobile phone), which may be the display screen 204 of FIG. 2. In another embodiment, the display screen subsystem may be provided by a display device that is coupled directly to the computer system 400 (e.g., a display device coupled to a desktop computing device by a cabled or wireless connection). The display screen subsystem 406 may include any of the display screens discussed above, and may include the touch screen components and/or virtual touch screen components discussed above. For example, the display screen subsystem 406 may include a display screen presence sensor 408 that may include any of the sensors discussed above for detecting the presence of a user and/or active pen interacting physically and/or virtually with the display screen in the display screen subsystem 406. The chassis 402 may also house a communication subsystem 410 that is coupled to the display engine 404 (e.g., via a coupling between the processing system and the communication subsystem 410). In an embodiment, the communication subsystem 410 may be provided by a wireless communication subsystem (e.g., a WiFi communication subsystem, a BLUETOOTH® communication subsystem, and/or other wireless communication subsystems known in the art), a network interface controller (NIC), and/or other communication subsystems known in the art.

In an embodiment, the memory system may also include instructions that, when executed by the processing system, cause the processing system to provide an application engine 412 that is configured to perform the functions of the application engines and computing devices discussed below. The application engine 412 may provide any of a variety of applications known in the art on the computing device 400, and may be configured to communicate with the display engine 404 as discussed below. In a specific example, the application engine 412 may provide an operating system for the computer system 400, as well as any of the particular applications used in the examples discussed below. The chassis 402 may also house storage device (not illustrated, but which may be the storage device 108 discussed above with reference to FIG. 1) that provides a storage system 414 that is configured to store pressure based applications 416 that may be provided by the application engine 412. The storage system 414 may also include one or more grip profiles 418 that may be universal for all pressure based applications 416, and/or that may include grip profiles that are specific to each pressure based application. For example, the grip profiles 418 may include gesture profiles and event profiles that are associated with various gesture inputs and event inputs that are discussed in further detail below. The computing device information, the event information, gesture information, as well as other data utilized by components (e.g., the application engine 412) in the computer system 400 may be stored in the storage system 414. While a specific embodiment of the computer device 400 is illustrated and described herein, one of skill in the art in possession of the present disclosure will recognize that a wide variety of modification to the components and configuration of the computer system 400 will fall within the scope of the present disclosure.

Figure 5:
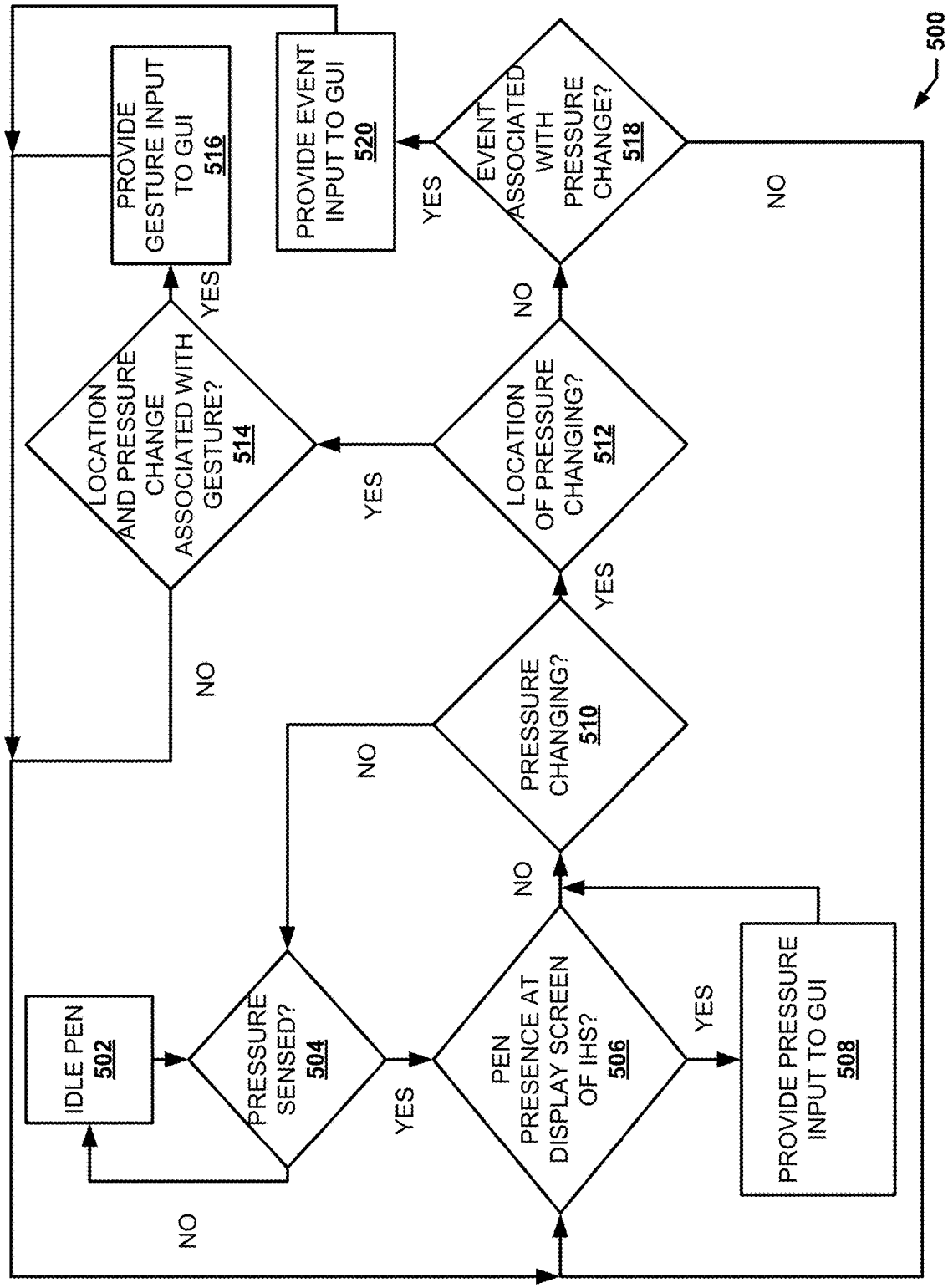
FIG. 5 is a flow chart illustrating an embodiment of a method for providing active pen inputs to a computing device.

Referring now to FIG. 5, an embodiment of a method 500 for providing input to a computing device is illustrated. As discussed above, in conventional systems, when users want to change ink intensity provided by an active pen or other electronic drawing/writing tool, they do so by increasing or decreasing the pressure of engagement of the pen tip on the display surface upon which the active penis being used. Conventional active pens include pen tips that sense the amount of pressure being applied to a display screen via the active pen, and applications being executed on a computer device that is coupled to the display screen may use this pressure information to produce various inputs on the graphical user interface that is displayed on the display screen. However, engaging the active pen with the display screen in such manner can compromise the user's ability to grip and control of the active pen, can damage display screens (e.g., especially fragile organic light emitting diode OLEDs display screens), and operate to defeat the purpose of virtual touch display screens that do not require a user to actually physically engage the display screen to produce inputs, as well as other issues with sensing active pen engagement through the pen tip to produce an input. It has been discovered that, when users wish to apply more or less pressure to the pen tip to change the intensity of the pen tip input, those users often provide more or less pressure at the locations on the drawing/writing utensil at which the user is grasping the drawing/writing utensil. The systems and methods of the present disclosure leverage this discovery to provide a pressure sensing system that includes a pressure sensitive gripping element that is accessible on at least a portion of an outer surface of an active pen, and pressure information as well as, in some embodiments, location information associated with that pressure information, may be used to produce inputs to a graphical user interface on the display system. For example, the pressure inputs of the present disclosure may be provided in conjunction with a active pen tip input to a display screen system such that the user need only apply a steady, minimal engagement of the active pen tip with a display screen, or no pressure at all, when varying the intensity of the displayed pen stroke that is produced on the graphical user interface.

Figure 6A:
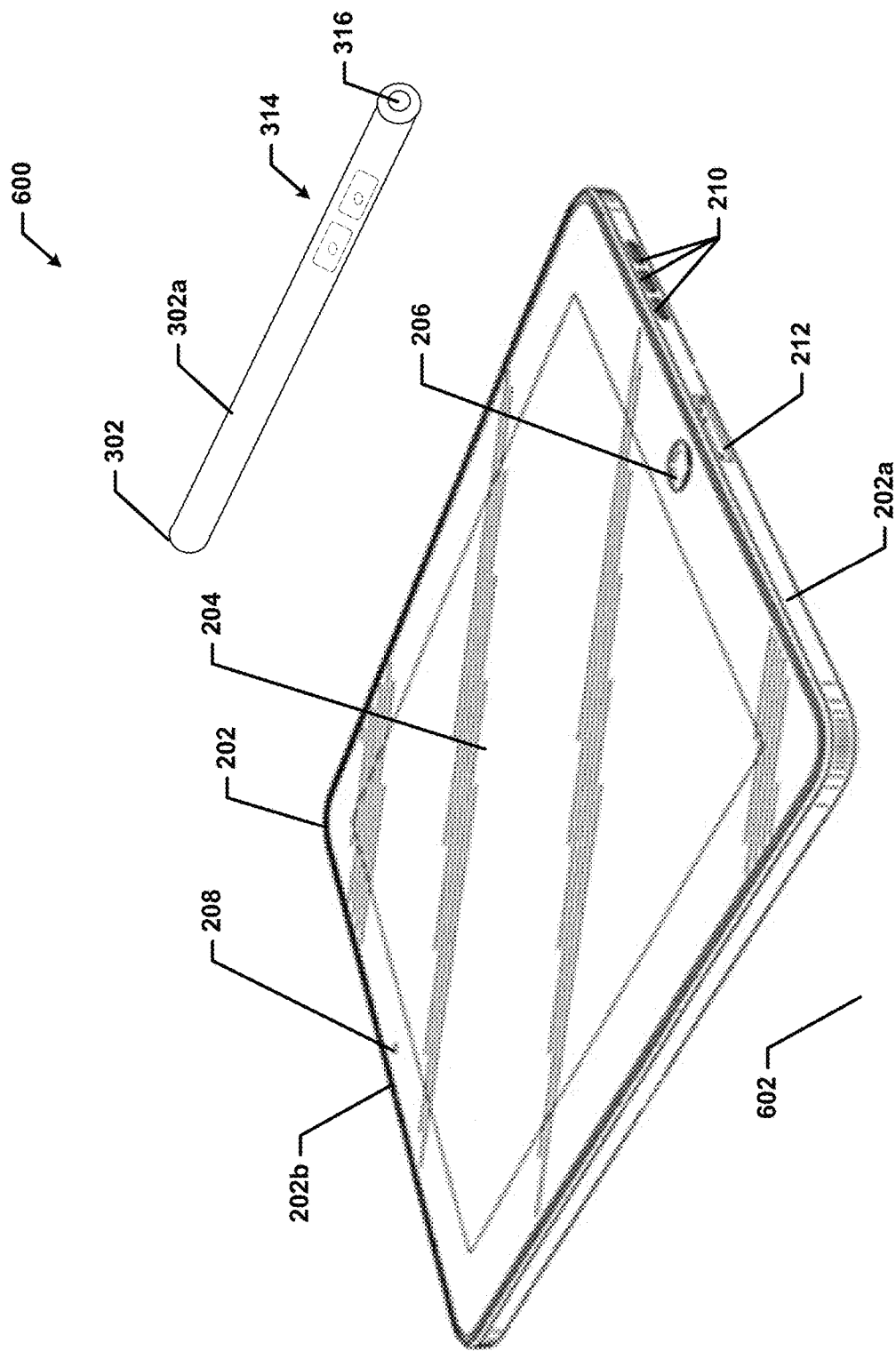
FIG. 6A is a perspective view illustrating an embodiment of an active pen system including the computing device of FIG. 2 and the active pen of FIGS. 3A and 3B.

The method begins at block 502 where the active pen is provided in an idle pressure input mode. Referring to FIG. 6A, an embodiment of an active pen system 600 is illustrated that includes the computing device 200, discussed above with reference to FIG. 2, and the active pen 300, discussed above with reference to FIGS. 3a and 3b. In the embodiment illustrated in FIG. 6A, the computing device 200 and the active pen 300 are located on one or more surfaces 602 (e.g., a desktop or other table top surface). In the illustrated example, a user may have been using the active pen 300 with the computing device 200, and then at or before block 502 may have set the active pen 300 on the surface 602 such that the active pen 300 remains immobile on the surface 602 for some period of time. In another example, a user may be using the active pen 300 with the IHS 200, and may then at or before block 502 disengage the active pen 300 and the computing device 200 while still holding the active pen 300. In another example, the user may use the active pen 300 with the computing device 200, and may then at or before block 502 disengage the active pen 300 from the computing device 200, and may then regrip the active pen in an area on the outer surface 302a where no pressure sensitive gripping element 314 is located. In yet another example, at or before block 502 the user may use the active pen 300 with the computing device 200 while not engaging the pressure sensitive gripping element 314. While a few examples have been provided, one of skill in the art in possession of the present disclosure will recognize that a wide variety of scenarios may result in the active pen 300 entering an idle mode, some of which are discussed in more detail below.

The method 500 then proceeds to block 504 where it is determined whether pressure is sensed at the active pen. In an embodiment, at block 504, the pressure input engine 308 in the active pen 300 may determine at block 504 whether a pressure is being applied to the pressure sensitive gripping element 314. For example, at block 504 the pressure input engine 308 may monitor for a signal generated by the one or more of the pressure sensors 314a-314c. If pressure is sensed at block 504, then the pressure input engine 308 may enter a pressure input mode where pressure and, in some embodiments, location of that pressure, that is detected at the pressure sensitive gripping element 314 may be used to provide inputs to a graphical user interface provided for display on the display screen 204. For example, pressure may be sensed by the pressure input engine 308 (e.g., via the pressure sensors 314a-314c) when a predetermined threshold pressure is satisfied. Monitoring for a predetermined threshold pressure may operate to prevent the provisioning of pressure inputs in situations where the active pen 300 is resting on the surface 602 in FIG. 6A, or inserted into an active pen holder that has a surface that may provide a pressure to the pressure sensitive gripping element 314 due to the weight of the active pen 300 and/or movement of the active pen within the active pen holder. In another example, pressure may be sensed by the pressure input engine 308 (e.g., via the pressure sensors 314a-314c) when at least two locations on the pressure sensitive gripping element 314 experience any pressure, or pressure that exceeds the predetermined pressure threshold. In yet another example, a pressure based application 416 (e.g., a drawing application) may be running on the computing device 400 and may be communicating with the pressure input engine 308 via the communication subsystems 312 and 410 to, for example, provided instructions that pressure inputs provided on the pressure sensitive gripping element 314 should be captured. While a few examples have been provided of determining whether pressure is sensed at the active pen 300 at block 504, one of skill in the art in possession of the present disclosure will recognize that a wide variety of pressure sensing scenarios that result in pressure being sensed at the pressure sensitive gripping element 314 in order to activate a pressure input mode of the active pen 300 will fall within the scope of the present disclosure as well. If, at block 504, pressure is not sensed at the active pen 300, the method returns to block 502 where the operating mode of the active pen 300 remains in an idle mode, or is switched to an idle mode (e.g., if pressure is not sensed at the active pen for some minimum amount of time).

If, at block 504, it is determined that pressure is sensed at the active pen, a pressure input mode may be initialized and the method 500 then proceeds to block 506 where it is determined whether the active pen is engaged with a display screen. In an embodiment, at block 506 and referring to FIG.

Figure 6B:
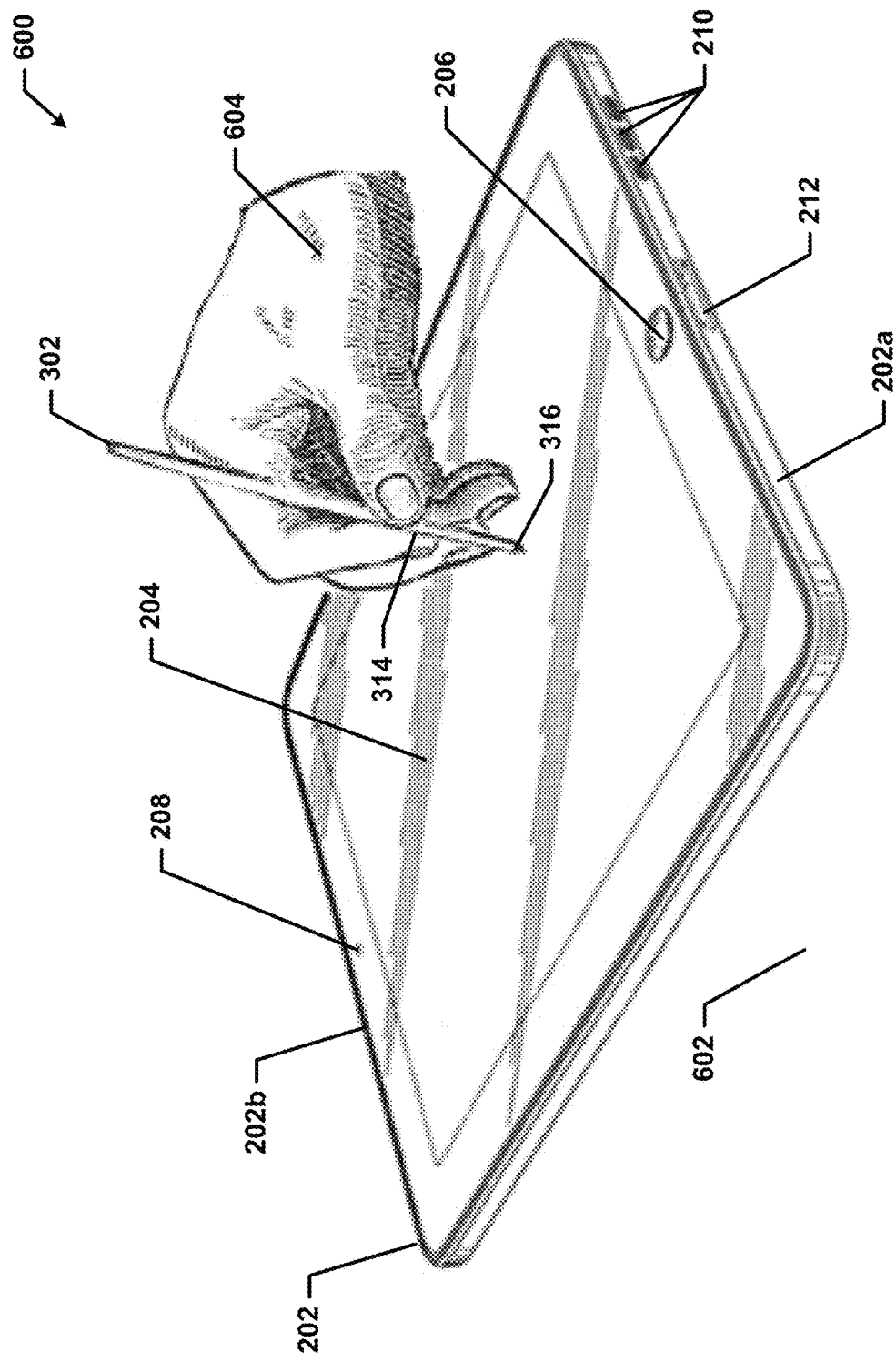
FIG. 6B is a perspective view illustrating an embodiment of the engagement of the active pen of FIGS. 3A and 3B with the computing device of FIG. 2.
Figure 6C:
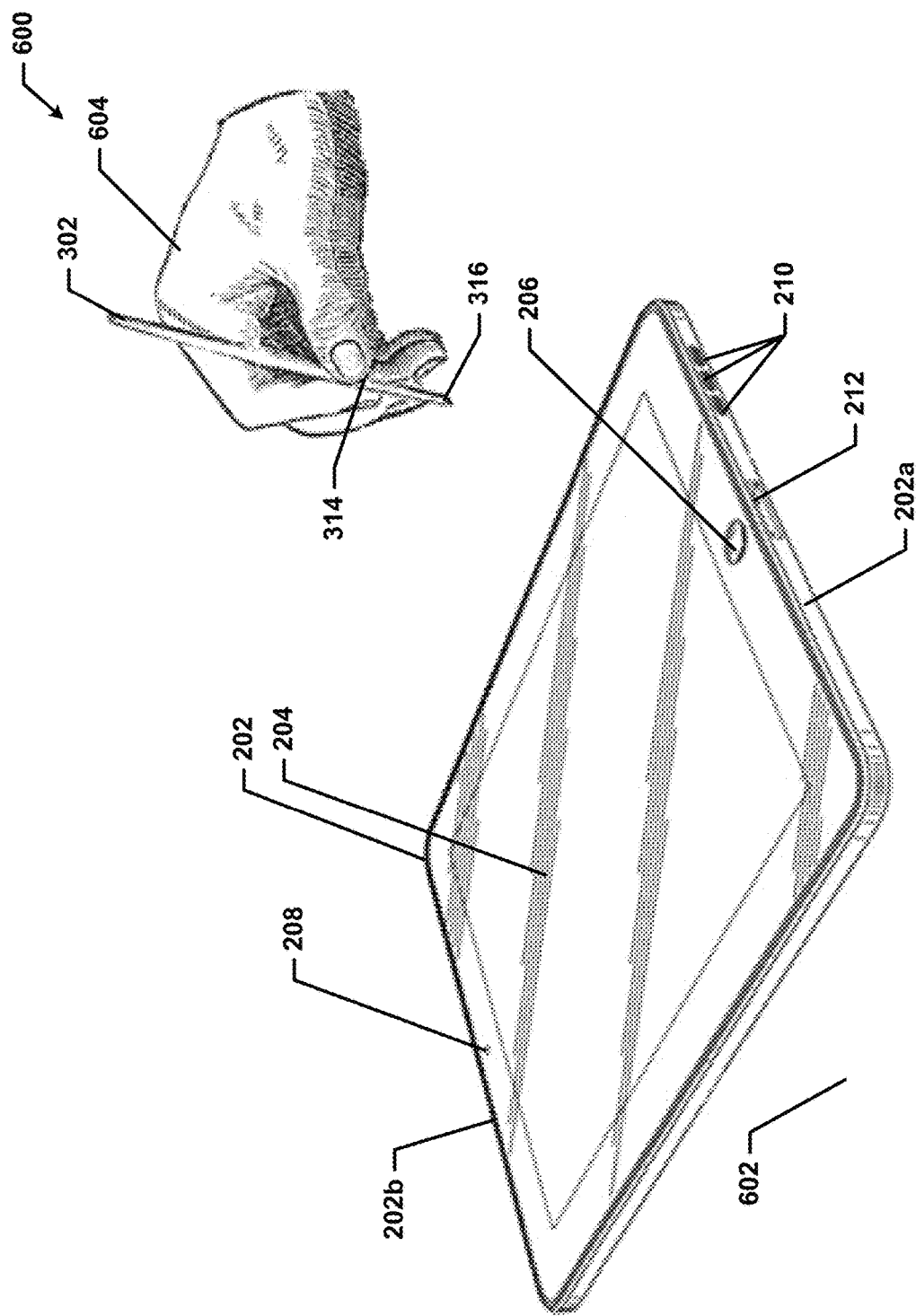
FIG. 6C is a perspective view illustrating an embodiment a user applying pressure to a pressure sensitive gripping element on the active pen of FIGS. 3A and 3B while the active pen is not engaging the computing device of FIG. 2.

6B and FIG. 6C, the pressure input engine 308 may operate to detect whether the pen tip 316 of the active pen 300 has engaged the display screen 204 of the computing device 200. In an embodiment, "engagement" of the pen tip 316 and the display screen 204 may be detected by the engagement sensor 318 and/or the display screen presence sensor 408, and may include direct physical contact between the pen tip 316 and the display screen 204 (e.g., as detected by pressure engagement sensor 318), electrical communication between the pen tip 316 and the display screen 204 resulting from the positioning the pen tip 316 within a minimum distance from the display screen 204 with or without actually physically contacting the pen tip 316 and the display screen 204 (e.g., detected by an capacitive engagement sensor included in the display screen presence sensor 408), and/or a variety of other engagement scenarios that would be apparent to one of skill in the art in possession of the present disclosure. Thus, in some embodiments of block 506, the pressure input engine 308 may monitor the engagement sensor 318 to determine whether engagement of the pen tip 316 and the display screen 204 is detected (or not detected) for a predetermined time period. In an example, as illustrated in FIG. 6B, the active pen 300 may be detected as engaging the display screen 204 when the pen tip 316 is detected by the engagement sensor 318 and a pressure based application 416 is running on the computer system 400. In another example, the active pen 300 may be detected as engaged with the display screen 204 when the pressure based application 416 is running on the computer system 400 and the pen tip 316 is providing pen tip inputs to that pressure based application 416 via communication with a virtual touch display screen that do not require the pen tip 316 actually physically contact the display screen 204. FIG. 6C illustrates how the active pen 300 may not be engaged with the display screen 204 when the user 604 has moved the active pen 300 away from the display screen such that the pen tip 316 is not in physical contact with the display screen 204 and, as discussed below, the active pen 300 of the present disclosure may be utilized to provide inputs to the computing device 200 in such scenarios as well. While a few examples have been provided of determining whether the active pen 300 is engaged with or disengaged from the display screen 204, one of skill in the art in possession of the present disclosure will recognize that a wide variety of active pen/computing engagement scenarios will fall within the scope of the present disclosure as well.

If, at block 506, it is determined that the active pen is engaged with the display screen, the method 500 then proceeds to block 508 where pressure information is captured from the pressure sensitive gripping element 314, and that pressure information may be used to provide a pressure input to a graphical user interface provided for display on the display screen 204. In an embodiment, at block 508, the pressure information may include first force data and, optionally, first location data, that may be generated in response to a first user interaction by a user 604 with the pressure sensitive gripping element 314 at a first time, and that may be captured by the pressure input engine 308. For example, the first user interaction may include the user 604 gripping the pressure sensitive gripping element 314 using any of the variety of grips described above. As such, the first force data may be generated in response to pressure provided to one or more of the pressure sensors 314a-314c, and the pressure information captured at block 508 may be associated with the pressure sensor 314a-314c that caused it to be captured, the location of which may be provided in the first location data. As such, pressure information captured at block 508 may allow the system to determine amount(s) of pressure that are applied to any location(s) on the pressure sensitive gripping element 314.

In various embodiments, the pressure information may be provided via the communication subsystem 312 to the computer system 400 such that the display engine 404 and/or the application engine 412 may use the pressure information to provide a pressure input to the graphical user interface displayed on the IHS display screen 204. The pressure input may be combined with a pen tip input that is a result of the engagement of the pen tip 316 with IHS display screen 204 to provide an active pen input to the graphical user interface. For example, the active pen input may include the pen tip input, which may be an "inked," "painted," "markered," "chalked," "crayoned," "penciled," etc. line/shape and the pressure input, which may provide the intensity, thickness, texture, and/or other features in the line/shape being provided by the pen tip 316. The active pen input may also include a first pressure input based on the first force data and the first location data, which may provide a first intensity, thickness, texture, and/or other feature in the line/shape being input by the pen tip input. In another example, the pressure input engine 308 may determine from the pressure information captured from the pressure sensitive gripping element 314 the pressure input to provide to the display engine 404 and/or the application engine 412 and send instruction via the communication subsystem 312 of what pressure input to provide in conjunction with the pen tip input to the graphical user interface provided on the IHS display screen 204.

Following block 508, or after it is determined that the active pen is not present at the display screen in block 506, the method 500 may proceed to block 510 to determine whether the pressure sensed at the active pen is changing. In an embodiment, at block 510, the active pen 300 and/or the computer system 400 may determine whether the pressure being provided on the active pen 300 is changing (e.g., whether the first force data captured at the first time is different than second force data captured at a second time using, for example, the pressure signals generated by the pressure sensors 314a-314c on the pressure sensitive gripping element 314.) For example, at block 510 the user 604 may be providing different pressure(s) on the same pressure sensors at which the pressure was detected at block 504, or may remove all pressure from any of those sensors. In another example, pressure sensors that were not receiving any pressure at block 504 may receive pressure from the user 604 interaction at the second time at block 510. If the pressure has not changed at the pressure sensitive gripping element 314 at block 510, then the method 500 may proceed to block 504 where it is determined whether pressure is being sensed as discussed above.

If it is determine that the pressure has changed at block 510, then the method 500 proceeds to block 512 where it may be determined whether the location of the pressure has changed. In an embodiment, at block 512, the pressure input engine 308 in the active pen 300 may determine whether the location of the pressure detected at block 504 and/or block 510 has changed. For example, at block 512 the pressure input engine 308 may determine that pressure is now being applied at a one or more different pressure sensors than detected pressure at block 504 (e.g., that may include one or more pressure sensors 314a-314c detecting pressure at the second time that did not detect pressure at the first time, or that detected a different pressure at the first time.) in a specific example, for the location of pressure detection to change at block 512, a minimum number of pressure sensors may be required to detect a change in pressure location (e.g., a minimum number of a second set of pressure sensors that are different than the pressure sensors that detected the pressure at block 504 must detect the pressure provided at the different location(s).) The number of pressure sensors detecting the pressure location change may be required to exceed a predefined threshold (e.g., thresholds of 90%, 75%, 50%, 25%, 10%, 5%, and/or other thresholds depending on the desired functionality) in order to determine at block 512 that the location of the pressure being applied to the active pen 300 is changing. In specific embodiments, the change in pressure location may be due to the user 604 moving one or more of the user's fingers along the pressure sensitive gripping element 314 (e.g., "swiping" or other gestures discussed below), may be due to the user 604 removing one or more of the user's fingers from first pressure sensor(s) and engaging second pressure sensor(s) (e.g., a "tap" or other input discussed below). At block 512 the pressure input engine 308 may determine the location of the changing pressure based, for example, on a known or reported location of each pressure sensor 314a-314c and/or a known or reported location of a group of pressure sensors in the grid of pressure sensors that are included in the pressure sensitive gripping element 314.

If, at block 512, it is determined that the location of the pressure has changed, then the method 500 may proceed to block 514 where it is determined whether the location change and/or the pressure change are associated with a gesture. In an embodiment, at block 514, the active pen 300 and/or the computer system 400 may determine whether the pressure information including any or all of the first force data, the first location data, the second force data, the second location data, and/or any subsequent force/location data indicate that that a gesture has been provided by a user interaction with the active pen 300. For example, the pressure input engine 308, the display engine 404, and/or the application engine 412 may compare the pressure information and/or any other force data and location data captured between the first time and the second time with a grip profile (e.g., a grip profile 418 stored in the storage system 414 and/or stored in a storage system of the active pen 300). The grip profile 418 may include a plurality of gesture profiles that are associated with one or more gestures that may be provided via the pressure information, force data, and location data discussed above. In a specific example, the gesture profiles may include one or more gesture signatures that are each defined by force data and location data that may be generated on the pressure sensitive gripping element 314, and the gesture signatures may include actual data and/or feature vector information that the pressure input engine 308, the display engine 404, and/or the application engine 412 may computationally process (e.g., with the captured pressure information) to determine whether there is some minimum correspondence between the gesture signature and the pressure information that indicates that a gesture has been provided. Upon minimal correspondence (e.g., 100%, 95%, 90%, 70%, 60%, 40% or any other predetermined correspondence threshold value depending on the desired application) between a gesture signature and the pressure information, the pressure input engine 308, the display engine 404, and/or the application engine 412 may determine that a gesture was performed as a result of the user interaction with the active pen 300, and the method 500 may proceed to block 516 where a gesture input is produced on the graphical user interface displayed on the computing device 200. If, at block 514, it is determined that the pressure information including the first force data, the first location data, the second force data, the second location data, and/or any other data does not substantially correspond with a gesture signature, then the method 500 may return to block 506.

In an embodiment, at block 516, the pressure input engine 308, the display engine 404, and/or the application engine 412 may determine which gesture input to provide based on the gesture profile. For example, each gesture profile may be associated with a gesture input that is produced on the graphical user interface when the user interaction indicates a particular gesture. In one example, the pressure input engine 308 in the active pen 300 may detect the gesture and determine the associated gesture input, and then provide instructions to the display engine 404 and/or the application engine 412 to produce that gesture input on the graphical user interface displayed on the display screen 204. In another example, the pressure information may have been provided to the display engine 404 and/or the application engine 412 in the computing device 400, and the display engine 404 and/or the application engine 412 may then detect that a gesture has been performed, may determine any gesture inputs associated with that gesture in the gesture profiles stored in the grip profiles 418, and produce those gesture input(s) on the graphical user interface provided on the display screen 204. In another example, each stored gesture profile for a detected gesture may include a plurality of gesture inputs that will be produced on the graphical user interface depending on a condition in the system. For example, a first gesture input resulting from a first gesture that is provided when the pen tip 316 is engaged with the display screen 204 may be different than the first gesture input for the first gesture when the pen tip 316 is not engaged with the display screen 204. Similarly, the gesture input resulting from a gesture may vary between pressure based applications running on the computing device 200.

In a specific example, the gesture provided by the user may include sliding one of the user's fingers away from the pen tip 316 on the pressure sensitive gripping element 314, which may be interpreted as a first direction "scroll" gesture associated with scrolling of information (e.g., text in a word processing document) displayed on the graphical user interface. In response, the application engine 412 may produce a gesture input that causes the information displayed on the graphical user interface on the display screen 204 to scroll in a first direction that is dictated by the gesture. In another example, the gesture provided by the user may include sliding a finger toward the pen tip 316 on the pressure sensitive gripping element 314, which may be interpreted a second direction "scroll" gesture associated with scrolling information (e.g., text in a word processing document) displayed on the graphical user interface. In response, the application engine 412 may produce a gesture input that causes the information displayed on the graphical user interface on the display screen 204 to scroll in a second direction (e.g., opposite the first direction discussed above) that is dictated by the gesture. While a few examples have been provided in providing a gesture input to a graphical user interface on an IHS display screen 204, one of skill in the art in possession of the present disclosure will recognize a wide variety of gestures and corresponding gesture inputs will fall within the scope of the present disclosure as well such as, for example, rotating the active pen radially (e.g., clockwise or counterclockwise), providing different pressure levels and/or speeds to the pressure sensitive gripping element 314.

If, at block 512, it is determined that the location of the pressure is not changing, then the method 500 may proceed to block 518 where it is determined whether the pressure change detected at block 510 is associated with an event. In an embodiment, at block 518 the pressure input engine 308, the display engine 404, and/or the application engine 412 may determine whether the pressure change is associated with an event. For example, the pressure input engine 308, the display engine 404, and/or the application engine 412 may compare the pressure change to the grip profiles 418 to determine whether the pressure change substantially corresponds with an event profile that is associated with an event and an event input that should be produced on the graphical user interface. For example, the event profile may include predetermined force thresholds that, when satisfied, indicate that the user interaction (e.g., the change in pressure) has provided an event which is associated with an event input that should be produced on the graphical user interface. In a specific example, when the pressure detected on the active pen 300 reaches a first threshold, the event input may produce instructions to perform a mouse click on the graphical user interface, while if the pressure detected on the active pen 300 reaches a second threshold, the event input may produce instructions to "Select All" information displayed on the graphical user interface. Furthermore, if the pressure detected on the active pen 300 satisfies a third threshold, the event input associated with the third threshold may produce instructions to capture a screen shot of information displayed on the graphical user interface. In other embodiments, an event may not be associated with an event input, but rather may be associated with an instruction provided to the computer system 400 and/or the active pen 300. For example, if the pressure detected on the active pen 300 reaches a maximum threshold where any further pressure may damage the pressure sensitive gripping element 314, the event may include providing instructions to the haptic feedback device 315 to signal (e.g., light, sound, vibration, or other physical sensation) to the user 604 that too much pressure is being provided to the pressure sensitive gripping element 314. In another example, the event profiles may be application specific such that pressure detected at a first threshold when a word processing application is running on the computing device may cause the word processing application to print a document, while pressure detected at the first threshold when a photo editing application is running on the computing device may cause the photo editing application to switch between colors. Similarly, the event input(s) produced according to each event profile may depend on other conditions such as, for example, whether the pen tip 316 is engaged with the IHS display screen 204. While a few examples have been described of producing an event input on a graphical user interface on an display screen 204, one of skill in the art in possession of the present disclosure will recognize a wide variety of events and corresponding event inputs may be provided while remaining within the scope of the present disclosure.

If it is determined at block 518 that the pressure change is not associated with an event, then the method 500 may return to block 506 to determine if the active pen is detected at the display screen at block 506 and, if so, to block 508 where the pressure input is provided to the graphical user interface. During a second iteration of the method 500, at block 508, the pressure information may include second force data and/or second location data that may be provided to the display engine 404 and/or the application engine 412 to produce a second pressure input on the graphical user interface, which may produce a second intensity, thickness, texture, and/or other feature in the line/shape provided by the input of the pen tip to the display screen, and that is different than produced in response to the first pressure input discussed above. Furthermore, if the pressure change at block 518 is associated with the event, then the method 500 may proceed to block 520 where the event input is produced on the graphical user interface of the display screen 204 as discussed above, and the method 500 may then return to block 506.

Thus, systems and methods have been described that provide for an active pen to provide a pressure based input to a display screen in response to the application of pressure to a pressure sensitive gripping element included on the active pen, which solves problems associated with damaging a pen tip included on the active pen and/or the display screen when engagement and varying pressure is required by pen tip with the display screen in conventional active pen systems, as well as problems associated with obtaining pressure readings when the display screen utilizes a virtual touch display screen that does not require the pen tip to physically engage the display screen to produce digital "ink". The systems and methods of the present disclosure may allow varying pressure inputs to the pressure sensitive gripping element in combination with pen tip inputs to a display screen when the pen tip is physically or virtually engaged with the display screen to produce inputs to graphical user interfaces as well. Furthermore, the pressure information obtained from the pressure sensitive gripping element may also be used to produce gesture inputs and/or event inputs on the graphical user interface displayed on the display screen when the pen tip of the active pen is engaged or not engaged with the display screen, thus increasing the functionality of the active pen in manner that allow the active pen to provide the functionality of a mouse, touch pad, or other touch input device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An active pen, comprising:
 a pen chassis including a pen tip;
 a pressure sensing system that includes a pressure sensitive gripping element that is accessible on at least a portion of an outer surface of the pen chassis;
 a communication system;
 a processing system that is coupled to the pressure sensing system and communication system; and
 a memory system that is housed in the pen chassis and that includes instructions that, when executed by the processing system, causes the processing system to provide a pressure engine that is configured to:
  capture first force data that is generated in response to a first user interaction with the pressure sensitive gripping element at a first time when the pen tip is engaged with a display screen of a computer device to provide a first pen input that is configured to cause the display of digital ink;
  use the first force data and the first pen input to cause a graphical user interface that is provided on the display screen of the computer device to display digital ink having a digital ink characteristic that is provided at a first characteristic level that is based on the first force data;

capture second force data that is generated in response to a second user interaction with the pressure sensitive gripping element at a second time when the pen tip is engaged with the display screen of the computer device to provide a second pen input that is configured to cause the display of digital ink;

use the second force data and the second pen input to cause the graphical user interface that is provided on the display screen of the computer device to display digital ink having the digital ink characteristics that is provided at a second characteristic level that is based on the second force data, wherein the second force data is different than the first force data and the second characteristic level of the digital ink characteristic is different than the first characteristic level of the digital ink characteristic;

capture first location data generated by the first user interaction with the pressure sensitive gripping element at the first time;

capture second location data generated by the second user interaction with the pressure sensitive gripping element at the second time; and provide the first force data, the first location data, the second location data, and the second force data via the communication system to the computer device to provide the second pen input to the graphical user interface provided on the display screen.

2. The active pen of claim 1, wherein the pressure sensitive gripping element includes a pressure sensor grid having a plurality of sensors that are each configured to:

generate a signal that is indicative of an amount of force provided on that sensor during the first user interaction; and provide coordinates for that sensor during the first user interaction.

3. The active pen of claim 1, wherein the pressure engine is further configured to:

determine that the first force data and the first location data captured at the first time and the second force data and the second location data captured at the second time are indicative of a gesture performance by a user on the pressure sensitive gripping element that is associated with a stored gesture and, in response, provide instruction associated with the stored gesture to the computer device to cause a gesture input to the graphical user interface provided on the display screen.

4. The active pen of claim 1, wherein the pressure engine is further configured to:

determine that the first force data indicates that a first predetermined event threshold associated with a first event has been satisfied and, in response, provide first instructions associated with the first event to the computer device.

5. The active pen of claim 1, wherein the digital ink characteristic includes at least one of a digital ink intensity, a digital ink thickness, and a digital ink texture.

6. An information handling system (IHS), comprising:
a computing device including:
a communication system;
a processing system coupled to the communication system; and
a display screen coupled to the processing system; and
a pen that is configured to provide an input to the computing device, the pen including:
a pen tip;
a pressure sensing system that includes a pressure sensitive gripping element that is accessible on at least a portion of an outer surface of the pen;
a pen communication system;
a pen processing system coupled to the pressure sensing system and the pen communication system; and
a pen memory system that includes instructions that, when executed by the pen processing system, causes the pen processing system to provide a pressure engine that is configured to:

capture first force data that is generated in response to a first user interaction with the pressure sensitive gripping element at a first time when the pen tip is engaged with the display screen to provide a first pen input that is configured to cause the display of digital ink;

use the first force data and the first pen input to cause a graphical user interface that is provided on the display screen to display digital ink having a digital ink characteristic that is provided at a first characteristic level that is based on the first force data;

capture second force data that is generated in response to a second user interaction with the pressure sensitive gripping element at a second time when the pen tip is engaged with the display screen to provide a second pen input that is configured to cause the display of digital ink;

use the second force data and the second pen input to cause the graphical user interface that is provided on the display screen to display digital ink having the digital ink characteristic that is provided at a second characteristic level that is based on the second force data, wherein the second force data is different than the first force data and the second characteristic level of the digital ink characteristic is different than the first characteristic level of the digital ink characteristic;

capture first location data generated by the first user interaction with the pressure sensitive gripping element at the first time;

capture second location data generated by the second user interaction with the pressure sensitive gripping element at the second time; and provide the first force data, the first location data, the second location data, and the second force data via the pen communication system to the communication system.

7. The IHS of claim 6, wherein the pressure sensitive gripping element includes a pressure sensor grid having a plurality of sensors that are each configured to:

generate a signal that is indicative of an amount of force provided on that sensor during the first user interaction; and provide coordinates for that sensor during the first user interaction.

8. The IHS of claim 6, wherein the pressure engine is further configured to:

determine that the first force data and the first location data captured at the first time and the second force data and the second location data captured at the second time are indicative of a gesture performance by a user on the pressure sensitive gripping element that is associated with a stored gesture and, in response, provide instruction associated with the stored gesture to the computing device.

9. The IHS of claim 6, wherein the pressure engine is further configured to:
    determine that the first force data indicates that a first predetermined event threshold associated with a first event has been satisfied and, in response, provide first instruction associated with the first event to the computing device.

10. The IHS of claim 6, wherein the digital ink characteristic is at least one of digital ink intensity, digital ink thickness, and digital ink texture.

11. An active pen method, comprising:
    communicatively coupling an active pen including a pen tip via a pen communication system with a computer communication system included on a computing device that includes a display screen;
    capturing, at a first time, first force data of a first user interaction with a pressure sensitive gripping element accessible on an outer surface of the active pen when the pen tip is engaged with the display screen to provide a first pen input that is configured to cause the display of digital ink;
    using the first force data and the first pen input to cause a graphical user interface that is provided on the display screen to display digital ink having a digital ink characteristic that is provided at a first characteristic level that is based on the first force data;
    capturing second force data generated by a second user interaction with the pressure sensitive gripping element at a second time when the pen tip is engaged with the display screen to provide a second pen input that is configured to cause the display of digital ink;
    using the second force data and the second pen input to cause the graphical user interface that is provided on the display screen to display digital ink having the digital ink characteristic that is provide at a second characteristic level that is based on the second force data, wherein the second force data is different than the first force data and the second characteristic level of the digital ink characteristic is different than the first characteristic level of the digital ink characteristic;
    capturing first location data generated by the first user interaction with the pressure sensitive gripping element at the first time;
    capturing second location data generated by the second user infraction with the pressure sensitive gripping element at the second time; and
    providing the first force data, the first location data, the second location data, and the second force data via a communication system to the computing device to provide the second pen input to the graphical user interface provided on the display screen.

12. The method of claim 11, further comprising:
    capturing a signal that is indicative of an amount of force provided on a pressure sensor included on a pressure sensor grid including a plurality of pressure sensors during the first user interaction; and
    providing coordinates for that pressure sensor during the first user interaction.

13. The method of claim 11, further comprising:
    determining that the first force data and the first location data captured at the first time and the second force data and the second location data captured at the second time are indicative of a gesture performed by a user on the pressure sensitive gripping element that is associated with a stored gesture and, in response, provide instruction associated with the stored gesture to the computing device to cause a gesture input to the graphical user interface provided on the display screen.

14. The method of claim 11, further comprising:
    determining that the first force data indicates that a first predetermined event threshold associated with a first event has been satisfied and, in response, providing first instructions associated with the first event to the computing device.

* * * * *